US011713704B1

(12) United States Patent
Harris et al.

(10) Patent No.: US 11,713,704 B1
(45) Date of Patent: Aug. 1, 2023

(54) EXHAUST BURNER CONTROL FOR REDUCED FUEL CONSUMPTION

(71) Applicant: Tenneco Automotive Operating Company Inc., Lake Forest, IL (US)

(72) Inventors: Thomas M. Harris, Jackson, MI (US); Nicholas Morley, Pinckney, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 0 days.

(21) Appl. No.: 17/731,362

(22) Filed: Apr. 28, 2022

(51) Int. Cl.
*F01N 3/20* (2006.01)
*F01N 3/035* (2006.01)

(52) U.S. Cl.
CPC ........... *F01N 3/2033* (2013.01); *F01N 3/035* (2013.01); *F01N 3/2006* (2013.01); *F01N 3/2066* (2013.01); *F01N 2900/1602* (2013.01)

(58) Field of Classification Search
CPC ...... F01N 3/2033; F01N 3/035; F01N 3/2006; F01N 3/2066; F01N 2900/1602
See application file for complete search history.

(56) References Cited

U.S. PATENT DOCUMENTS

| 10,738,676 | B2 | 8/2020 | Parrish |
| 10,753,291 | B1 | 8/2020 | Choung et al. |
| 10,941,689 | B2 | 3/2021 | Paukner et al. |
| 11,022,016 | B2 | 6/2021 | Huang et al. |
| 2003/0106309 | A1* | 6/2003 | Morimoto ............ F02D 41/029 60/297 |
| 2006/0130469 | A1* | 6/2006 | Baeuerle ................. F02B 37/18 60/300 |
| 2012/0053814 | A1* | 3/2012 | George ............... F02D 41/0235 701/102 |
| 2015/0007562 | A1* | 1/2015 | Morishima ......... F02D 41/0087 60/320 |
| 2017/0226911 | A1* | 8/2017 | Haas ..................... F01N 3/2033 |
| 2019/0003741 | A1* | 1/2019 | van Houten ........ G01F 15/0755 |
| 2020/0102874 | A1 | 4/2020 | Kurtz et al. |
| 2020/0173331 | A1 | 6/2020 | Bunkus et al. |
| 2020/0340380 | A1 | 10/2020 | Sato |

FOREIGN PATENT DOCUMENTS

| CN | 212563398 U | 2/2021 |
| DE | 4132814 C2 | 2/1994 |
| DE | 4437655 C2 | 3/1998 |

(Continued)

*Primary Examiner* — Brandon D Lee
(74) *Attorney, Agent, or Firm* — Harness, Dickey & Pierce, P.L.C.

(57) ABSTRACT

An exhaust control system for a vehicle includes at least one temperature sensor, positioned within an exhaust system of the vehicle, that is configured to generate a measurement signal indicative of at least one of an inlet temperature and an outlet temperature of a diesel oxidation catalyst (DOC). An exhaust control module is configured to turn on an exhaust burner on to heat exhaust flowing through the exhaust system, determine a total stored heat within the DOC based in part on the measurement signal, subsequent to turning on the exhaust burner, turn off the exhaust burner based on an upper threshold of the total stored heat, and, subsequent to turning off the exhaust burner, turn on the exhaust burner based on a lower threshold of the total stored heat, wherein the lower threshold is less than the upper threshold.

16 Claims, 4 Drawing Sheets

(56) References Cited

FOREIGN PATENT DOCUMENTS

| | | |
|---|---|---|
| DE | 102010027811 A1 | 10/2011 |
| DE | 102018126621 A1 | 4/2020 |
| DE | 102019202560 A1 | 8/2020 |
| DE | 102019115141 A1 | 12/2020 |
| DE | 102018118091 B4 | 12/2021 |
| EP | 1936274 B1 | 10/2011 |
| JP | 2016109096 A | 6/2016 |
| JP | 2019120203 A | 7/2019 |
| KR | 101393031 B1 | 5/2014 |
| WO | WO-2020108725 A1 | 6/2020 |
| WO | WO-2020161215 A1 | 8/2020 |

\* cited by examiner

EXHAUST BURNER CONTROL FOR REDUCED FUEL CONSUMPTION

FIELD

The present disclosure relates to exhaust control systems and methods and more particularly to systems and methods for controlling selective reduction catalyst (SCR) temperature and airflow into an exhaust system.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Air is drawn into an engine through an intake manifold. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust from an engine combusting diesel fuel with an excess of air may include particulate matter (PM) and gas. The exhaust gas includes nitrogen oxides (NOx), such as nitrogen oxide (NO) and nitrogen dioxide ($NO_2$). An exhaust treatment system may be used to reduce the amount of NOx and PM in the exhaust.

The exhaust treatment system may include a diesel oxidation catalyst (DOC). The DOC removes hydrocarbons and/or carbon oxides from the exhaust. The exhaust treatment system may also include a diesel particulate filter (DPF), which removes particulate matter (PM) from the exhaust. The exhaust treatment system may also include a selective catalytic reduction (SCR) catalyst. A diesel exhaust fluid (DEF) injector injects a DEF (e.g., a urea-water solution) into the decomposition tube or reactor, located upstream of the SCR catalyst. When the DEF encounters hot exhaust in the decomposition tube, the water portion undergoes evaporation and the urea undergoes decomposition to form ammonia. The ammonia (NH3) provided by the DEF is adsorbed by the SCR catalyst. When ammonia is present on the surface of the SCR catalyst, and the catalyst is hot, NOx in the exhaust will react with the ammonia to form nitrogen (N2). In this way the amount of NOx emitted by the engine is reduced.

SUMMARY

An exhaust control system for a vehicle includes at least one temperature sensor, positioned within an exhaust system of the vehicle, that is configured to generate a measurement signal indicative of at least one of an inlet temperature and an outlet temperature of a diesel oxidation catalyst (DOC). An exhaust control module is configured to turn on an exhaust burner on to heat exhaust flowing through the exhaust system, determine a total stored heat within the DOC based in part on the measurement signal, subsequent to turning on the exhaust burner, turn off the exhaust burner based on an upper threshold of the total stored heat, and, subsequent to turning off the exhaust burner, turn on the exhaust burner based on a lower threshold of the total stored heat, wherein the lower threshold is less than the upper threshold.

In other features, the exhaust control module is configured to determine the total stored heat within the DOC based on a heat storage tank model of the DOC. The exhaust control module is configured to determine the total stored heat within the DOC in accordance with $H_{DOC}=M*C*T$, where $H_{DOC}$ is the total stored heat within the DOC, M is a mass of the DOC, C is a heat capacity of the DOC, and T is a temperature associated with the DOC. The at least one temperature sensor includes a first temperature sensor positioned at an inlet of the DOC and a second temperature sensor positioned at an outlet of the DOC and the temperature associated with the DOC corresponds to an average of temperatures measured by the first temperature sensor and the second temperature sensor.

In other features, the exhaust control module is configured to turn on the exhaust burner prior to engine startup. Subsequent to turning on the exhaust burner based on the lower threshold of the total stored heat, the exhaust control module is configured to turn off the exhaust burner based on the upper threshold of the total stored heat. The exhaust control module is configured to detect a cold start condition and turn on the exhaust burner prior to engine startup in response to detecting the cold start condition. The exhaust control module is configured to increase an engine idle speed upon turning on the exhaust burner. The upper threshold of the total stored heat includes a first upper threshold and a second upper threshold less than the first upper threshold. The exhaust control module is configured to detect a cold start condition and selectively operate the exhaust burner according to one of the first upper threshold and the second upper threshold based on a determination of whether the cold start condition was detected.

A method of controlling an exhaust control system for a vehicle includes generating at least one measurement signal indicative of at least one of an inlet temperature and an outlet temperature of a diesel oxidation catalyst (DOC), turning on an exhaust burner on to heat exhaust flowing through the exhaust system, determining a total stored heat within the DOC based in part on the at least one measurement signal, subsequent to turning on the exhaust burner, turning off the exhaust burner based on an upper threshold of the total stored heat, and, subsequent to turning off the exhaust burner, turning on the exhaust burner based on a lower threshold of the total stored heat, wherein the lower threshold is less than the upper threshold.

In other features, the method further includes determining the total stored heat within the DOC based on a heat storage tank model of the DOC. The method further includes determining the total stored heat within the DOC in accordance with $H_{DOC}=M*C*T$, where $H_{DOC}$ is the total stored heat within the DOC, M is a mass of the DOC, C is a heat capacity of the DOC, and T is a temperature associated with the DOC. The method further includes generating the at least one measurement signal using a first temperature sensor positioned at an inlet of the DOC and a second temperature sensor positioned at an outlet of the DOC, wherein the temperature associated with the DOC corresponds to an average of temperatures measured by the first temperature sensor and the second temperature sensor.

In other features, the method further includes turning on the exhaust burner prior to engine startup. The method further includes, subsequent to turning on the exhaust burner based on the lower threshold of the total stored heat, turning off the exhaust burner based on the upper threshold of the total stored heat. The method further includes detecting a cold start condition and turning on the exhaust burner prior to engine startup in response to detecting the cold start condition. The method further includes increasing an engine idle speed upon turning on the exhaust burner. The upper threshold of the total stored heat includes a first upper threshold and a second upper threshold less than the first upper threshold. The method further includes detecting a cold start condition and selectively operating the exhaust burner according to one of the first upper threshold and the second upper threshold based on a determination of whether the cold start condition was detected.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
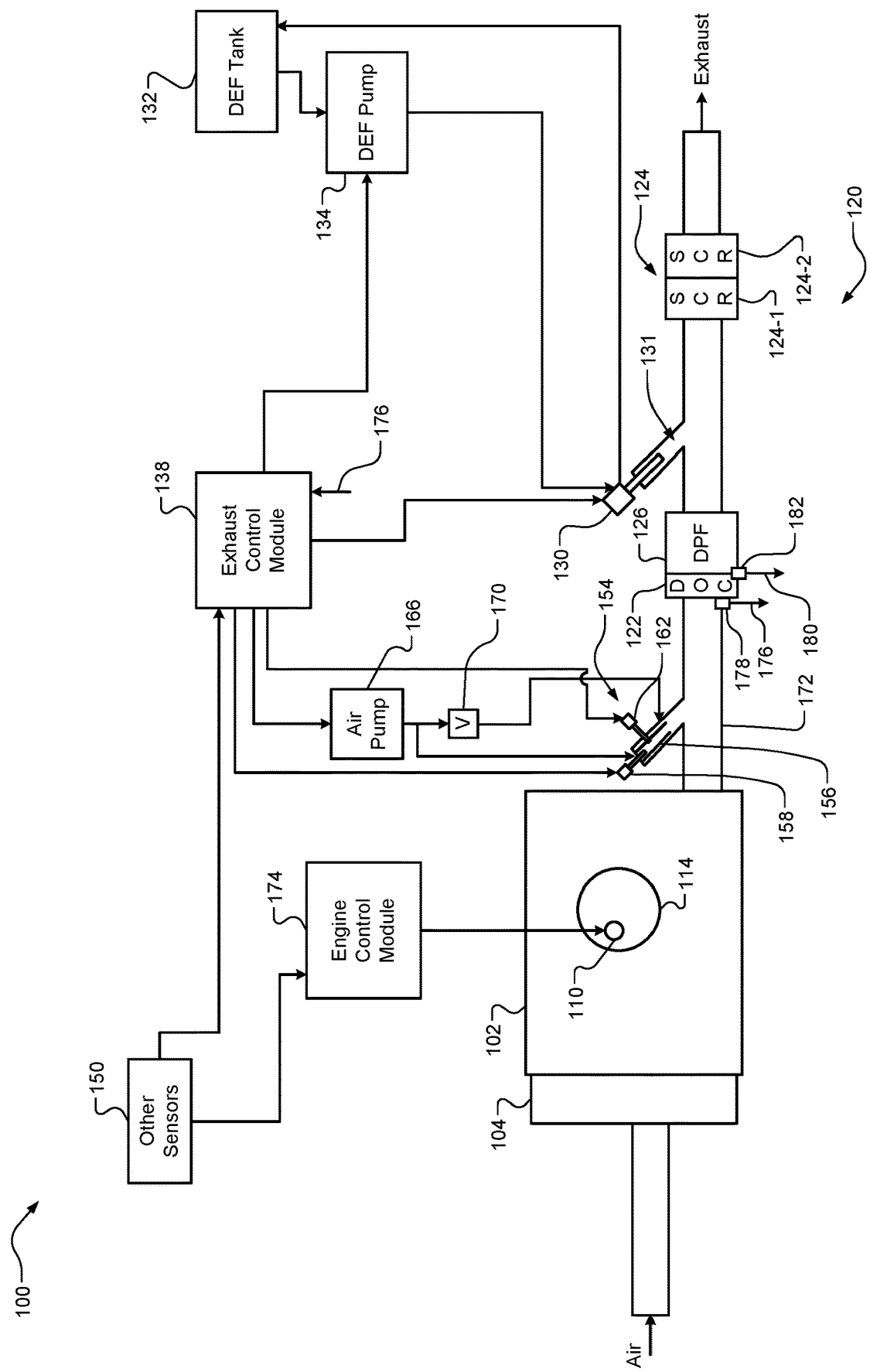
FIG. 1A is a functional block diagram of an example engine system.

A control module controls injection of a diesel exhaust fluid (DEF) into an exhaust system upstream of a selective catalytic reduction (SCR) catalyst. The SCR catalyst receives exhaust output by an engine of a vehicle. The exhaust includes nitrogen oxides (NOx). The DEF includes urea and water. Heat from the exhaust decomposes urea from the DEF into ammonia (NH3). The SCR catalyst stores ammonia. Ammonia reacts with NOx in the exhaust thereby reducing the amount of NOx that is output from the SCR catalyst.

The engine may generate a high level of NOx at startup. The amount of ammonia stored on (by) the SCR at startup, however, may be low. The temperature of the exhaust at engine start up may be too low to enable DEF injected into a decomposition tube to be processed into ammonia. The NOx output of the vehicle may therefore be relatively high after engine startup.

The SCR catalyst may be warmed using an exhaust burner prior to and/or upon engine startup. The burner combusts air and fuel to warm the SCR catalyst. Combustion may be initiated by a spark plug or another type of ignition device. Warming the SCR catalyst may decrease NOx output of the vehicle after engine startup by preparing the SCR catalyst to store ammonia for reaction with NOx sooner than if warming is not performed. In some conditions, DEF injection may be started prior to engine startup to further decrease NOx output of the vehicle after engine startup.

Accordingly, in some conditions the exhaust burner may be used to pre-heat the SCR catalyst (i.e., prior to engine startup). Conversely, the exhaust burner may be used upon engine startup in cold start conditions (i.e., upon receiving an engine start signal in cold start conditions). In cold start conditions, it is desirable to heat up the SCR catalyst and other components of the exhaust treatment system as quickly as possible. As such, the exhaust burner may be controlled to heat the exhaust system to a relatively high temperature to ensure that the exhaust burner is not turned off before the SCR catalyst is adequately heated during cold start conditions.

Subsequent to a cold start, the engine may continue to operate under low load for some period of time, resulting in relatively cool exhaust and causing the SCR catalyst to operate at sub-optimal temperatures. Further, use of the exhaust burner to heat the exhaust will become necessary, but use of the exhaust burner consumes additional fuel, decreasing fuel economy and increasing carbon dioxide production.

Exhaust burner control systems and methods according to the present disclosure are configured to regulate the exhaust burner to minimize fuel consumption and maintain SCR catalyst temperatures for optimizing NOx conversion during low-load operation. For example, one or more components of the exhaust system (e.g., one or a combination of a diesel oxidation catalyst (DOC), a diesel particulate filter (DPF), etc.) are modelled as a heat storage tank and an indicator of total stored heat within the heat storage tank (e.g., enthalpy) is calculated based on various system inputs. The exhaust burner is selectively activated based on the calculated enthalpy and one or more thresholds. For example, hysteresis control is implemented to turn off the exhaust burner when the calculated enthalpy reaches an upper threshold and turn on the exhaust burner when the calculated enthalpy reaches a lower threshold.

Although described with respect to exhaust burners, the principles of the present application may also be implemented using other types of exhaust heaters, including, but not limited to, high-powered electrical heaters.

Referring now to FIG. 1A, a functional block diagram of an example engine system 100 is presented. An engine 102 generates propulsion torque for a vehicle. While the engine 102 is shown and will be discussed as a diesel engine, the engine 102 may be another suitable type of engine. One or more electric motors (or motor-generators) may additionally generate propulsion torque. For example, air is drawn into the engine 102 through an intake manifold 104. One or more fuel injectors, such as fuel injector 110, inject fuel that mixes with air to form an air/fuel mixture. The air/fuel mixture is combusted within cylinders of the engine 102, such as cylinder 114.

Exhaust is expelled from the engine 102 to an exhaust system 120. The exhaust may include particulate matter (PM) and exhaust (e.g., exhaust gas). The exhaust includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes a diesel oxidation catalyst (DOC) 122, a diesel particulate filter 126, and one or more selective catalytic reduction (SCR) catalysts, such as SCR catalyst 124-1 and SCR catalyst 124-2 (collectively "SCR catalyst 124"). The SCR catalyst 124-1 may, for example, include an iron zeolite or another suitable type of SCR catalyst. The SCR catalyst 124-2 may include a copper zeolite or another suitable type of SCR catalyst. In various implementations, the SCR catalysts 124-1 and 124-2 may be implemented within the same housing.

The exhaust flows from the engine 102 to the DOC 122. Exhaust output from the DOC 122 flows to the DPF 126.

The DPF 126 filters particulate from the exhaust. In various implementations, the DPF 126 and the DOC 122 may be implemented within the same housing. While the example of the DPF 126 being disposed downstream of the DOC 122 is provided, the DPF 126 may alternatively be disposed upstream of the DOC 122. The exhaust flows from the DPF 126 to the SCR catalyst 124.

A diesel exhaust fluid (DEF) injector 130 injects a DEF into the exhaust system 120 upstream of the SCR catalyst 124. For example, the DEF injector 130 may inject the DEF into a decomposition tube 131 where water in injected DEF evaporates and urea is decomposed and hydrolyzed into NH3. The decomposition tube 131 may also be referred to as a reactor. For example only, the decomposition tube 131 may be located between the DOC 122 and the SCR catalyst 124. The DEF includes urea (e.g., CO(NH2)2) and water. The DEF is stored in a DEF tank 132 before injection. A DEF pump 134 draws DEF from the DEF tank 132 and pumps the DEF to the DEF injector 130.

An exhaust control module 138 controls actuation (e.g., opening and closing) of the DEF injector 130 and therefore controls injection of DEF into the exhaust system 120. The exhaust control module 138 may also control operation of the DEF pump 134, such as to maintain a predetermined pressure of DEF input to the DEF injector 130, as described in FIG. 2 in more detail.

When the engine is running, normal burner and DEF control may be used. When the engine is running, urea from DEF injected by the DEF injector 130 reacts with the hot exhaust to produce ammonia, and ammonia is supplied to the SCR catalyst 124. Heat evaporates the water in the DEF, and ammonia (NH3) is supplied to the SCR catalyst 124.

The SCR catalyst 124 stores (i.e., adsorbs) ammonia supplied by the DEF. The SCR catalyst 124 catalyzes a reaction between stored ammonia and NOx passing the SCR catalyst 124. The amount of ammonia stored by the SCR catalyst 124 may be referred to as current storage. A percentage of NOx input to the SCR catalyst 124 that is removed from exhaust via reaction with ammonia may be referred to as NOx conversion efficiency. The NOx conversion efficiency is a function of the current storage of the SCR catalyst 124. For example only, the NOx conversion efficiency may increase as the current storage of the SCR catalyst 124 increases and vice versa.

The current storage of the SCR catalyst 124, however, is limited to a maximum amount of ammonia. This maximum amount of ammonia is referred to as a maximum storage capacity of the SCR catalyst 124. Maintaining the current storage of the SCR catalyst 124 near the maximum storage capacity ensures that a maximum possible amount of NOx is removed from the exhaust. In other words, maintaining the current storage near the maximum storage capacity may ensure that a greatest possible NOx conversion efficiency is achieved. However, an inverse relationship exists between the maximum storage capacity and a temperature of the SCR catalyst 124. More specifically, the maximum storage capacity decreases as the SCR temperature increases during engine operation and vice versa. The reaction of ammonia with NOx produces nitrogen and water. Other components of the exhaust, such as oxygen (O2), may also be involved in the ammonia and NOx reaction.

One or more sensors 150 may be implemented in the exhaust system 120, such as one or more NOx sensors, one or more temperature sensors, one or more oxygen sensors, and/or one or more other types of sensors. For example, a temperature sensor may measure a temperature of the SCR catalyst 124. In various implementations, the temperature of the SCR catalyst 124 may be estimated based on one or more exhaust temperatures. Other example types of sensors include a mass air flowrate (MAF) sensor, a recirculated exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors.

A burner 154 may also be connected to the exhaust system 120, such as upstream of the DOC 122 and the DPF 126. The burner 154 may include a fuel injector 158, a spark plug 162, and an air pump 166. While the example of the burner 154 including a spark plug is provided, the present application is also applicable to other types of igniters and ignition devices. When on, the air pump 166 pumps air into a combustion chamber (within a flame sheath 156) and to the exhaust system 120. The fuel injector 158 injects fuel (e.g., diesel fuel) into the combustion chamber. The fuel mixes with the air from the air pump 166. The spark plug 162 generates spark within the combustion chamber. The spark ignites the air and fuel from the fuel injector 158 and the air pump 166. The flame sheath 156 is configured to shield a flame within the combustion chamber from being blown out, such as by exhaust from the engine 102 while the engine 102 is running.

The combustion of the air and fuel generates hot gas, which can be used to heat one or more components of the exhaust system 120 and/or for one or more other reasons. The exhaust control module 138 controls fuel injection by the fuel injector 158, spark generation by the spark plug 162, and operation of the air pump 166. In various implementations, the exhaust control module 138 may control a speed of the air pump 166, whether or not the burner 154 is receiving fuel for combustion. When receiving fuel, the exhaust control module 138 may control the speed of the air pump 166 to achieve the desired air-to-fuel ratio. If the burner 154 is operated while the engine is running, the exhaust control module 138 may operate the burner 154 over a full range of air-to-fuel ratios that enable stable combustion.

The air pump 166 also pumps air to an air valve (V) 170. The air valve 170 regulates airflow to a second location, such as around the flame sheath 156. Flowing air around the flame sheath 156 may cool the flame sheath 156 and increase a lifetime of the flame sheath 156. In various implementations, the second location may be between the flame sheath 156 and an exhaust pipe 172 that is connected to the burner 154. Alternatively, the air valve 170 may output air from the air pump 166 directly to the exhaust pipe 172. The exhaust control module 138 also controls actuation of the air valve 170.

An engine control module (ECM) 174 controls a torque output of the engine 102 while the engine 102 is running. The ECM 174 also controls starting and shutdown of the engine 102. The ECM 174 may start the engine 102, for example, in response to user actuation of one or more user input devices, such as an ignition button or switch of the vehicle and/or a combination of one or more user input devices of a key fob. The ECM 174 may shut down the engine 102, for example, in response to user actuation of the one or more user input devices (e.g., the ignition button or switch) of the vehicle and/or the one or more user input devices of the key fob.

As discussed above, the exhaust control module 138 may control injection of the DEF by the DEF injector 130. For example only, the exhaust control module 138 may control the timing and rate of DEF injection. By controlling DEF injection, the exhaust control module 138 controls the supply of ammonia to the SCR catalyst 124 and the current storage of the SCR catalyst 124. The exhaust control module 138 may determine a target supply rate for supplying ammonia to the SCR catalyst 124, determine a target DEF injection rate to achieve the target supply rate, and control the injection of DEF at the target DEF injection rate.

The NOx emissions of the vehicle may be relatively high in response to engine startup. In some examples, the SCR catalyst 124 may be warmed while the engine 102 is off before an engine startup. Warming before engine startup is performed by operating the burner 154 before the engine startup. The exhaust control module 138 may control the burner 154 (fueling via the fuel injector 158 and/or air from the air pump 166), such as using a fuel lean air/fuel mixture for warming. During the warming, the air valve 170 may be closed such that no air flows through the air valve 170 to the second location. While the engine 102 is running after startup, the exhaust control module 138 may partially or completely open the air valve 170 such that air flows from the air pump 166 to the second location.

If the temperature of the SCR catalyst 124 becomes greater than a predetermined temperature during the warming before engine startup, the exhaust control module 138 may begin DEF injection. The predetermined temperature may correspond to a temperature above which DEF may decompose into ammonia. Warming the SCR catalyst 124 may enable a decrease in NOx emissions of the vehicle after engine startup as DEF injection may begin sooner after the engine startup. DEF injection before engine startup may further decrease NOx emissions of the vehicle after engine startup.

At the beginning of a cold start, the burner 154 may be operated to heat up the SCR catalyst 124 as quickly as possible. In this manner, the burner 154 will not be turned off before the SCR catalyst 124 is adequately heated during cold start conditions. However, subsequent to a cold start, the engine 102 may continue to operate under low load for some period of time, resulting in relatively cool exhaust and causing the SCR catalyst 124 to operate at sub-optimal temperatures. Further, use of the burner 154 to heat the exhaust consumes additional fuel, decreasing fuel economy and increasing carbon dioxide production.

The exhaust control module 138 according to the present application is configured to implement multi-tier threshold hysteresis control of the burner 154 based on a calculation of total stored heat (e.g., enthalpy) within the DOC 122 and/or the DPF 126. For example, the exhaust control module 138 is configured to control the burner 154 (i.e., selectively turn the burner on and off) in response to a calculation of the enthalpy of the DOC 122 based on a heat storage tank model of the DOC 122 and various measurement signals indicative of temperatures of the exhaust at inputs and outputs of the DOC 122, the DPF 126, etc. For example, a signal 176 (from sensor 178) indicates a temperature at an inlet of the DOC 122 and a signal 180 (from sensor 182) indicates a temperature at an outlet of the DOC 122.

The burner 154 is turned on until the total stored heat within the DOC 122 reaches a first (upper) threshold and is then turned off. The burner 154 is turned off until the total stored heat within the DOC 122 decreases to a second (lower) threshold and is then turned on. Although described below with respect to the total stored heat within the DOC 122, in other examples the principles of the present disclosure may be applied to a calculation of the total stored heat within the DOC 122 and the DPF 126 (or a portion of the DPF 126), the total stored heat within the DPF 126, or any other combination of components of the exhaust system 120.

In this manner, the burner 154 is controlled to maintain the total stored heat within the DOC 122 between the upper and lower thresholds. At greater temperatures, NOx conversion is increased while fuel production and $CO_2$ production are also increased. Conversely, at lower temperatures, NOx conversion is decreased while fuel production and $CO_2$ production are also decreased. In other words, if the burner 154 is turned off sooner, an average temperature of the DOC 122 and the DPF 126 decreases (corresponding to a lower temperature of the SCR catalyst 124). Accordingly, while lowering the temperature conserves fuel and lowers $CO_2$ emissions, NOx conversion of the SCR catalyst 124 is less effective. The upper and lower thresholds of the total stored heat according to the present disclosure are selected to balance NOx conversion, fuel consumption, and $CO_2$ production.

In one example, the total stored heat $H_{DOC}$ (in kJ) within the DOC 122 can be calculated according to $H_{DOC}=M*C*T$ (Equation 1), where M is a mass (kg) of the DOC 122, C is a heat capacity (kJ/kg-K) of the DOC 122, and T is a temperature (K) associated with the DOC 122. For example, the temperature T may be calculated as an average of the temperature at the inlet of the DOC 122 and the temperature at the outlet of the DOC 122.

Figure 1B:
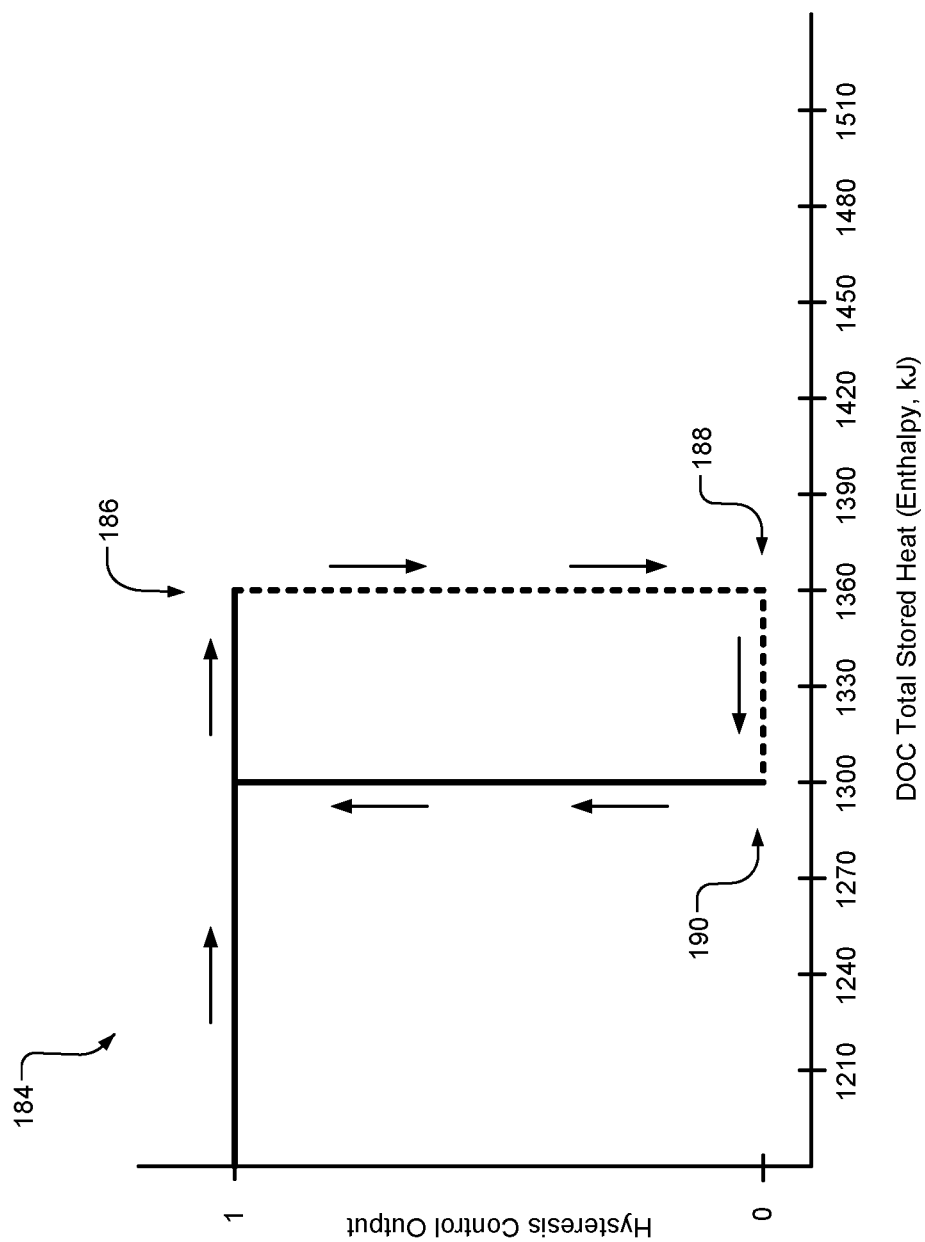
FIG. 1B illustrates an example of hysteresis control of an exhaust burner.

FIG. 1B illustrates an example of hysteresis control of the burner 154 according to the present disclosure. For example, the exhaust control module 138 is configured to calculate a total stored heat of the DOC 122 (e.g., using a heat storage tank model of the DOC 122 and Equation 1) and generate a hysteresis control output 184 to turn the burner 154 on and off based on the total stored heat and upper and lower thresholds. For example only, the hysteresis control output 184 is a binary control signal having a value of "1" to turn on the burner 154 and a value of "0" to turn off the burner 154. In this example, the upper threshold is 1360 kJ and the lower threshold is 1300 kJ. The hysteresis control output 184 is shown as a solid line when the burner 154 is on and the total stored heat is increasing. Conversely, the hysteresis control output 184 is shown as a dashed line when the burner 154 is off and the total stored heat is decreasing.

The hysteresis control output 184 is initially (e.g., prior to and/or upon startup, etc.) set to 1 to turn on the burner 154. While the burner 154 is on, the total stored heat increases and reaches the upper threshold as shown at 186. The hysteresis control output 184 then transitions from 1 to 0 to turn off the burner 154 and the total stored heat begins to decrease as shown at 188. The total stored heat decreases until the lower threshold is reached and the hysteresis control output 184 transitions from 0 to 1 to turn on the burner 154 as shown at 190. The total stored heat then begins to increase from the lower threshold to the upper threshold. In this manner, the exhaust control module 138 controls the burner 154 such that the total stored heat is maintained between the upper and lower thresholds.

The upper and lower thresholds are shown only as examples and other values for the upper and lower thresholds may be used. In some examples, the upper threshold may be varied based on operating conditions. For example, a first upper threshold may be used when cold start conditions are detected (e.g., engine coolant being below a predetermined threshold, such as 35° C.). The first upper threshold may be selected to be high enough to ensure that the burner 154 is on long enough to heat the exhaust to a desired temperature. The exhaust control module 138 may then use a second upper threshold a predetermined period subsequent to the cold start. The second upper threshold is less than the first upper threshold.

The exhaust control module 138 may optionally use a third upper threshold upon startup when cold start conditions are not detected (e.g., during "hot" start conditions). For example, cold start conditions may not be detected when coolant temperature and/or other factors indicate that the engine 102 has been operated recently, corresponding to a warm or hot start. For example, hot start conditions may be met when the engine has only been off for less than a predetermined period (e.g., less than 20 minutes). The third upper threshold may be greater than the second upper threshold but less than the first upper threshold.

In this manner, the exhaust control module 138 may operate in accordance with a two-tier or three-tier upper threshold. In some examples, the lower threshold may also be varied.

In some examples, the exhaust control module 138 may be further configured to increase an idle speed of the engine 102 while the burner 154 is on during cold start operation. Increasing the idle speed of the engine 102 increases exhaust flow to move heat generated by the burner 154 downstream, thereby preventing overheating of the burner 154 and optimizing NOx conversion.

In the above examples, subsequent to a cold start and when the engine 102 is not operating under sustained low-load conditions, the exhaust may reach a temperature sufficient to prevent the burner 154 from being turned on. For example, the calculated total stored heat of the DOC 122 may be maintained above the lower threshold during normal operation of the engine 102 even when the burner 154 is off. In this manner, the burner 154 is only operated when necessary.

Figure 2:
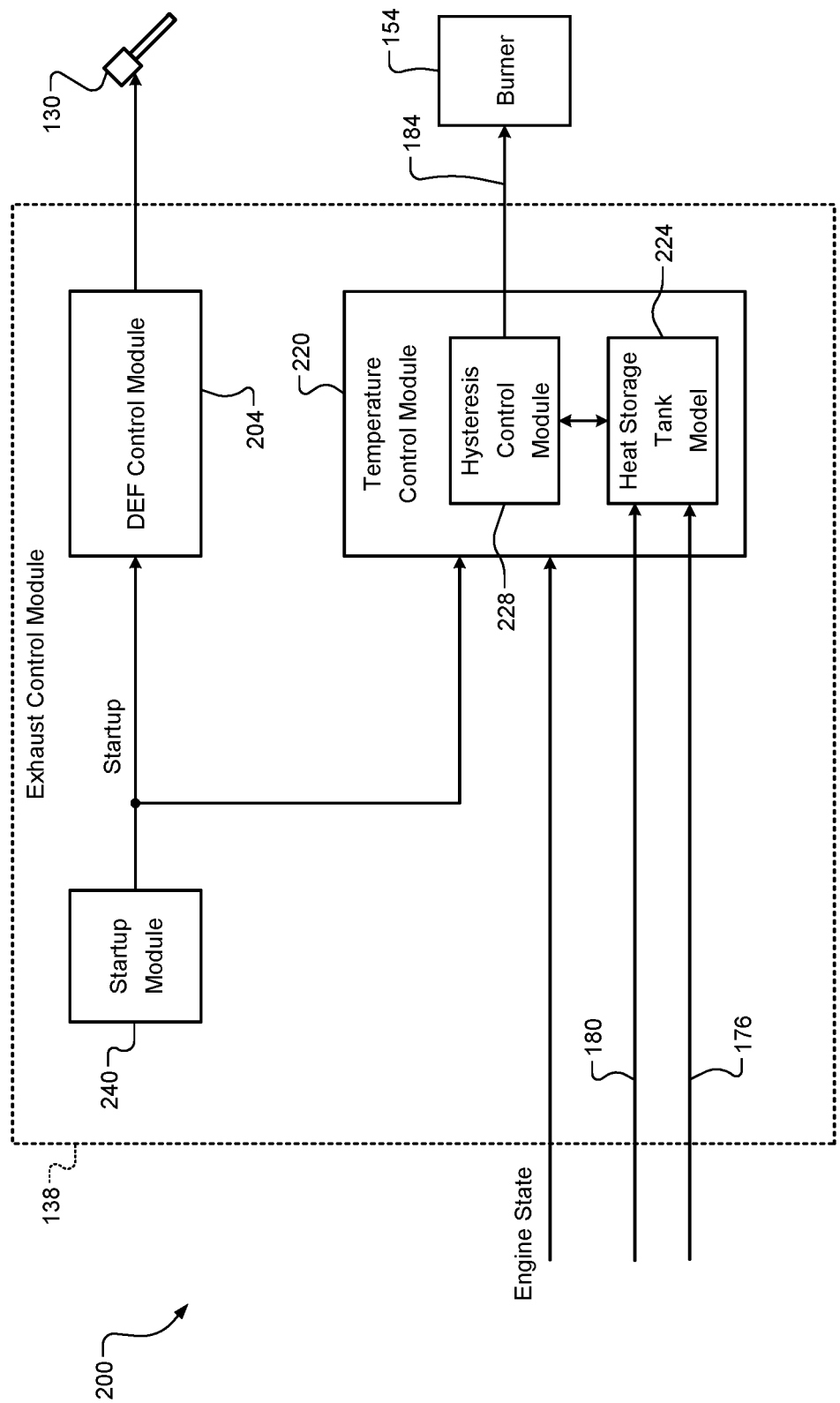
FIG. 2 is a functional block diagram of an example exhaust control system.

FIG. 2 is a functional block diagram of an example exhaust control system 200 including the exhaust control module 138 and the burner 154. A DEF control module 204 determines a target DEF injection rate, for example, based on a target (ammonia) supply rate to the SCR catalyst 124 and controls opening and closing of the DEF injector 130 to control injection and to achieve the target DEF injection rate. The DEF control module 204 may control the DEF injector 130 using pulse width modulation (PWM) control or another suitable type of control.

A temperature control module 220 controls operation of components such the air pump 166, the air valve 170, the fuel injector 158, and the spark plug 162. The temperature control module 220 according to the present application is configured to control the burner 154 based on a total stored heat (e.g., enthalpy) of the DOC 122 calculated in accordance with a heat storage tank model 224 of the DOC 122. For example, the temperature control module 220 includes a hysteresis control module 228 configured to generate the hysteresis control output 184 to selectively turn the burner 154 on and off based on the total stored heat (as calculated in accordance with Equation 1, signals 176 and 180 indicative of inlet and outlet temperatures, respectively, of the DOC 122, etc.) and upper and lower thresholds as described above in more detail.

A startup module 240 generates a startup signal indicating that the engine 102 has been started. In some examples, the startup module 240 may selectively generate a startup signal indicative of an upcoming engine startup (i.e., prior to the engine 102 being started). An engine state signal indicates whether the engine 102 is running (on), starting (startup), or shut down (off). The ECM 174 may set the engine state signal and output the engine state signal to other modules. When the startup signal is generated, the temperature control module 220 turns on the air pump 166. Additionally, the temperature control module 220 begins fuel injection via the fuel injector 158 and begins providing spark to ignite the air and fuel. Additionally, the temperature control module 220 opens the air valve 170 to a predetermined open position such that some air from the air pump 166 flows to the second location, such as around the flame sheath 156.

Figure 3:
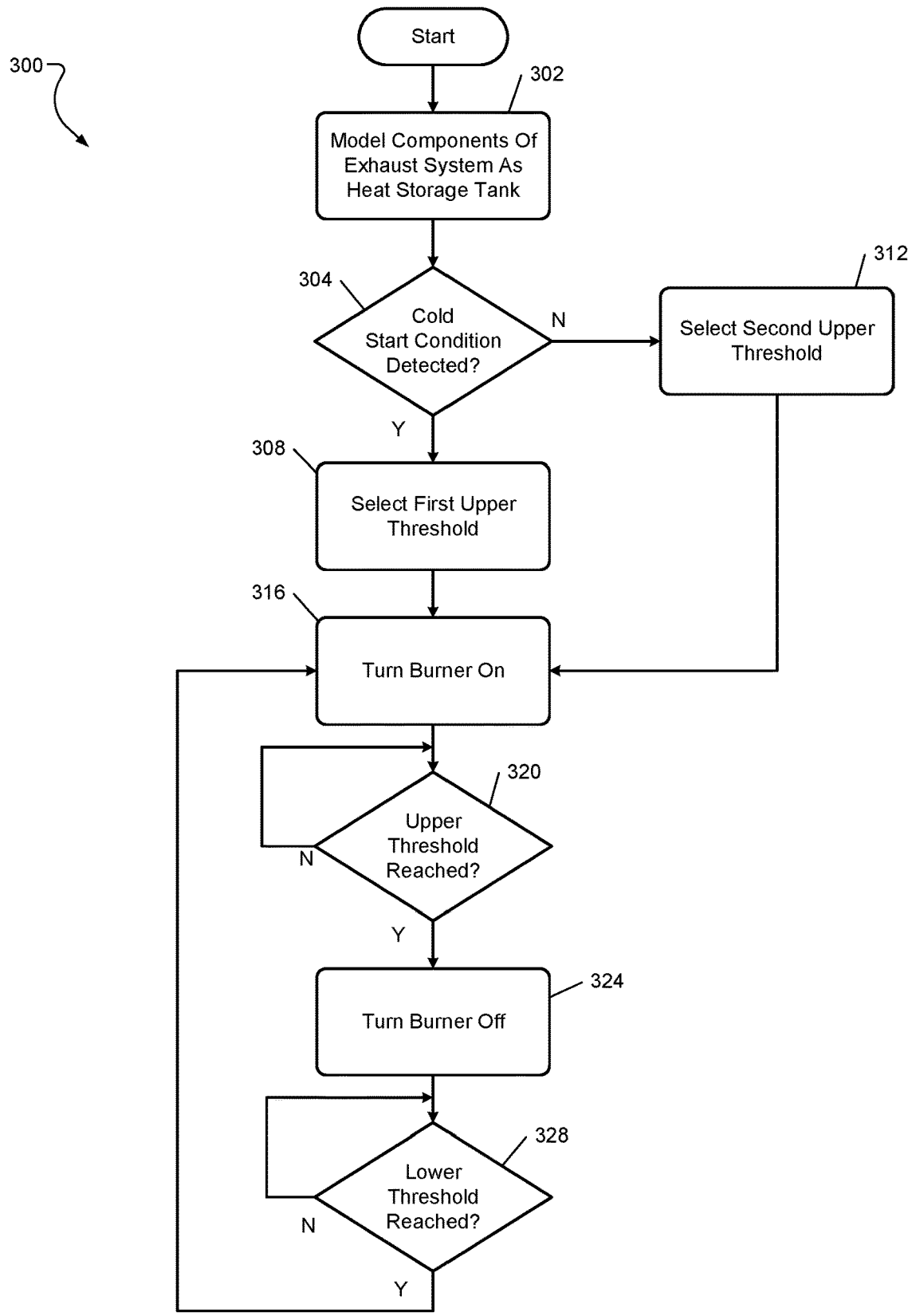
FIG. 3 is a flowchart of an example multi-tier threshold control method for an exhaust burner.

FIG. 3 is a flowchart depicting an example multi-tier threshold hysteresis control method 300 for an exhaust burner. The method 300 may be performed at engine startup and/or prior to engine startup as described above. For example, only, the method 300 is performed using the exhaust control module 138 and related components of the exhaust system 120.

The method 300 is configured to operate the burner 154 until an upper threshold is reached, turn off the burner 154 when the upper threshold is reached, and turn the burner 154 back on when a lower threshold is reached. In this example, the method 300 operates according to first and second upper thresholds based on whether a cold start condition is reached. In other examples, the method 300 may operate according to only one or more than two upper thresholds, more than one lower threshold, etc.

At 302, the method 300 models one or more components (e.g., the DOC 122) as a heat storage tank. For example, the model may be stored in the exhaust control module 138 and/or another location within the engine system 100. In other examples, all or portions of the model may be stored and/or executed at a location external to the engine system 100 (e.g., at a remote server, in a cloud computing system, etc.).

At 304, the method 300 optionally determines whether a cold start condition is detected. For example, the method 300 determines whether engine coolant temperature is below a threshold, the engine has been off for a predetermined period, etc. If true, the method 300 continues to 308 and selects a first upper threshold. If false, the method 300 selects a second upper threshold at 312. In some examples, the method 300 may end when cold start conditions are not detected and the engine may be started in accordance with normal operating parameters (e.g., without operating the burner 154).

At 316, the method 300 (e.g., the exhaust control module 138) turns on the burner 154. In some examples, the method 300 may increase engine idle speed upon turning the burner 154 on to increase exhaust flow. At 320, the method 300 determines whether a total stored heat in the DOC 122 has reached the upper threshold. For example, the method 300 calculates the total stored heat within the DOC 122 in accordance with the heat storage tank model 224 (e.g., using Equation 1) and compares the calculated total stored heat with the upper threshold. If true, the method 300 continues to 324. If false, the method 300 continues to update the calculated total stored heat to determine whether the total stored heat of the DOC 122 reaches the upper threshold.

At 324, the method 300 turns off the burner 154. At 328, the method 300 determines whether the total stored heat has reached the lower threshold. If true, the method 300 continues to 316 to turn on the burner 154. If false, the method 300 continues to update the calculated total stored heat to determine whether the total stored heat of the DOC 122 reaches lower upper threshold.

In this manner, the method 300 controls the burner 154 such that the total stored heat within the DOC 122 is maintained between the upper and lower thresholds.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust control system for a vehicle, the exhaust control system comprising:
at least one temperature sensor positioned within an exhaust system of the vehicle, wherein the at least one temperature sensor is configured to generate a measurement signal indicative of at least one of an inlet temperature and an outlet temperature of a diesel oxidation catalyst (DOC); and
an exhaust control module configured to
turn on an exhaust burner on to heat exhaust flowing through the exhaust system,
determine a total stored heat within the DOC based in part on the measurement signal,
subsequent to turning on the exhaust burner, turn off the exhaust burner based on an upper threshold of the total stored heat,
subsequent to turning off the exhaust burner, turn on the exhaust burner based on a lower threshold of the total stored heat, wherein the lower threshold is less than the upper threshold,
set the upper threshold of the total stored heat to a first upper threshold when a cold start condition is detected, and
set the upper threshold of the total stored heat to a second upper threshold less than the first upper threshold when a cold start condition is not detected.

2. The exhaust control system of claim 1, wherein the exhaust control module is configured to determine the total stored heat within the DOC based on a heat storage tank model of the DOC.

3. The exhaust control system of claim 2, wherein the exhaust control module is configured to determine the total stored heat within the DOC in accordance with $H_{DOC}=M*C*T$, and wherein $H_{DOC}$ is the total stored heat within the DOC, M is a mass of the DOC, C is a heat capacity of the DOC, and T is a temperature associated with the DOC.

4. The exhaust control system of claim 3, wherein the at least one temperature sensor includes a first temperature sensor positioned at an inlet of the DOC and a second temperature sensor positioned at an outlet of the DOC, and wherein the temperature associated with the DOC corresponds to an average of temperatures measured by the first temperature sensor and the second temperature sensor.

5. The exhaust control system of claim 1, wherein the exhaust control module is configured to turn on the exhaust burner prior to engine startup.

6. The exhaust control system of claim 1, wherein, subsequent to turning on the exhaust burner based on the lower threshold of the total stored heat, the exhaust control module is configured to turn off the exhaust burner based on the upper threshold of the total stored heat.

7. The exhaust control system of claim 1, wherein the exhaust control module is configured to detect a cold start condition and turn on the exhaust burner prior to engine startup in response to detecting the cold start condition.

8. The exhaust control system of claim 1, wherein the exhaust control module is configured to increase an engine idle speed upon turning on the exhaust burner.

9. A method of controlling an exhaust control system for a vehicle, the method comprising:
generating at least one measurement signal indicative of at least one of an inlet temperature and an outlet temperature of a diesel oxidation catalyst (DOC);
turning on an exhaust burner on to heat exhaust flowing through an exhaust system;
determining a total stored heat within the DOC based in part on the at least one measurement signal;
subsequent to turning on the exhaust burner, turning off the exhaust burner based on an upper threshold of the total stored heat;
subsequent to turning off the exhaust burner, turning on the exhaust burner based on a lower threshold of the total stored heat, wherein the lower threshold is less than the upper threshold;
setting the upper threshold of the total stored heat to a first upper threshold when a cold start condition is detected; and
setting the upper threshold of the total stored heat to a second upper threshold less than the first upper threshold when a cold start condition is not detected.

10. The method of claim 9, further comprising determining the total stored heat within the DOC based on a heat storage tank model of the DOC.

11. The method of claim 10, further comprising determining the total stored heat within the DOC in accordance with $H_{DOC}=M*C*T$, and wherein $H_{DOC}$ is the total stored heat within the DOC, M is a mass of the DOC, C is a heat capacity of the DOC, and T is a temperature associated with the DOC.

12. The method of claim 11, further comprising generating the at least one measurement signal using a first temperature sensor positioned at an inlet of the DOC and a second temperature sensor positioned at an outlet of the DOC, wherein the temperature associated with the DOC corresponds to an average of temperatures measured by the first temperature sensor and the second temperature sensor.

13. The method of claim 9, further comprising turning on the exhaust burner prior to engine startup.

14. The method of claim 9, further comprising, subsequent to turning on the exhaust burner based on the lower threshold of the total stored heat, turning off the exhaust burner based on the upper threshold of the total stored heat.

15. The method of claim 9, further comprising detecting a cold start condition and turning on the exhaust burner prior to engine startup in response to detecting the cold start condition.

16. The method of claim 9, further comprising increasing an engine idle speed upon turning on the exhaust burner.

* * * * *